United States Patent [19]

Neubert

[11] 4,285,850
[45] Aug. 25, 1981

[54] ADHESION OF POLYAMIDE OR POLYESTER CORDS TO RUBBER

[75] Inventor: Terry C. Neubert, Kent, Ohio

[73] Assignee: The General Tire & Rubber Company, Akron, Ohio

[21] Appl. No.: 126,744

[22] Filed: Mar. 3, 1980

Related U.S. Application Data

[62] Division of Ser. No. 32,071, Apr. 23, 1979, Pat. No. 4,251,409.

[51] Int. Cl.³ ........................ C08L 51/00; C08L 39/08
[52] U.S. Cl. ............................ 260/29.6 RB; 260/29.3; 260/29.6 NR; 260/29.7 D; 260/29.7 NR; 260/29.7 EM
[58] Field of Search ................. 260/29.7 D, 29.7 EM, 260/29.6 RB; 525/77, 70, 87, 902

[56] References Cited

U.S. PATENT DOCUMENTS

| | | | |
|---|---|---|---|
| 2,991,258 | 7/1961 | Haward et al. | 525/68 |
| 3,984,366 | 10/1976 | Elmer | 260/29.3 |
| 4,009,134 | 2/1977 | Elmer | 260/29.3 |
| 4,049,603 | 9/1977 | Elmer | 260/28.5 R |
| 4,134,869 | 1/1979 | Kalafus et al. | 260/29.3 |

FOREIGN PATENT DOCUMENTS

| | | |
|---|---|---|
| 595290 | 12/1947 | United Kingdom . |
| 778102 | 7/1957 | United Kingdom . |
| 907796 | 10/1962 | United Kingdom . |
| 919151 | 2/1963 | United Kingdom . |
| 987837 | 3/1965 | United Kingdom . |
| 1286684 | 8/1972 | United Kingdom . |
| 1490044 | 10/1977 | United Kingdom . |

*Primary Examiner*—Theodore E. Pertilla

[57] ABSTRACT

An aqueous alkaline dispersion of a rubbery graft low gel vinyl pyridine copolymer and a water soluble, heat reactive phenolic resin is useful in forming an adhesive for bonding polyamide or polyester reinforcing elements or cords to rubber compounds or stocks. After dipping the polyamide or polyester cord in the one-step adhesive dip, the coated cord is heated to dry it and heat cure or heat set the adhesive on the cord. Thereafter, the adhesive containing polyamide or polyester cord is combined with, or laminated to (calendered), a curable rubber compound and the resulting assembly is cured to form a composite in which the polyamide or polyester cord is bonded to the rubber by means of said adhesive.

3 Claims, No Drawings

ADHESION OF POLYAMIDE OR POLYESTER CORDS TO RUBBER

This is a division of application Ser. No. 032,071, filed Apr. 23, 1979, now U.S. Pat. No. 4,251,409, issued Feb. 17, 1981.

This invention relates to the adhesion of polyamide or polyester cords to rubber using an adhesive composition of a rubbery graft low gel vinyl pyridine copolymer and a phenolicaldehyde resin.

OBJECTS

An object of the invention is to provide a composite of a polyamide or polyester reinforcing element adhesively bonded to a rubber compound, e.g., polyamide or polyester tire cords adhesively bonded to rubber to provide carcass plies and belt plies for making tires. Another object is to provide polyamide or polyester reinforcing elements, e.g., such as those used in the belt and the carcass plies of tires, with a minor amount of an adhesive so that the adhesive containing elements may subsequently be bonded to rubber on curing. A further object is to provide a method for bonding polyamide and/or polyester reinforcing elements, particularly polyamide and polyester textiles, fibers, cords, yarns and so forth, to rubber compounds using a single dip. A still further object is to provide a polyamide or polyester fiber or cord adhesive dip composition. These and other objects and advantages of the present invention will become more apparent to those skilled in the art from the following detailed description and working examples.

DISCUSSION OF THE PRIOR ART

Copending U.S. Pat. application Ser. No. 14,659 filed Feb. 23, 1979, abandoned discloses that an aqueous alkaline dispersion of a rubbery vinyl pyridine copolymer, a rubbery polybutadiene or a rubbery copolymer of at least 80% butadiene and the balance a monoethylenically unsaturated monomer, and a water soluble, heat reactable phenolic-aldehyde resin, in certain amounts, wherein the rubbery polymers have a reduced amount of gel, is useful in forming an adhesive for bonding glass fiber reinforcing elements or cords to rubber compounds or stocks. After dipping the glass fiber cord in the one-step adhesive dip, the coated cord is heated to dry it and heat cure or heat set the adhesive on the cord. Thereafter, the adhesive containing glass fiber cord is combined with, or laminated (calendered) to, a curable rubber compound and the resulting assembly is cured to form a composite in which the glass fiber cord is bonded to the rubber by means of said adhesive.

SUMMARY OF THE INVENTION

According to the present invention it has been discovered that a composition comprising an aqueous alkaline dispersion of a rubbery low gel vinyl pyridine graft copolymer, and a heat reactable water soluble phenolicaldehyde resin, in certain amounts, is very useful as a treating, dipping or coating material for use in bonding polyamide or polyester reinforcing elements to rubber compounds. Sufficient alkaline material such as aqueous NH$_3$, KOH or NaOH may be added to the dispersion (or to one or more of the ingredients of the dispersion before mixing them together) to obtain the desired pH, prevent coagulation of the latex and to provide for stabilization. This will vary with the pH of the resin and the latex, all of which may vary from batch to batch. Since the amount of each compound may vary, the amount of alkaline material required can also vary. After drying the adhesive on the polyamide or polyester reinforcing element to remove water and to heat cure or heat set the adhesive on the element, the adhesive containing element can then be combined or calendered with a curable rubber compound and the resulting assembly cured, usually in a mold, to provide a laminate exhibiting good adhesive properties.

The use of the low gel rubbery graft vinyl pyridine copolymer enables the obtainment of high H-adhesions, in some cases higher than conventional adhesives using vinyl pyridine copolymers, but using less bound vinyl pyridine monomer. Forming a core or seed of BD-STY copolymers and a shell or graft of BD-VP copolymer means that more VP is on the outside of the copolymer rather than inside of it. It is recognized that a rubber polymer is a mixture of curled intertwined rubber chains. Moreover, since most of the styrene is in the core rather than in the shell, the Tg of the final polymer is not raised substantially, nor is the stiffness. An all styrene-vinyl pyridine copolymer shell or styrene-vinyl pyridine-butadiene shell tends to be soluble in the core and to increase stiffness and the Tg of the graft copolymer.

The present method involves only one dipping step, and the process or method can be varied to provide the desired pick-up or solids on the cord by varying the concentration of the dip or the speed of the cord through the dip to give the amount needed to develop the requisite adhesive bond. Thus, while the cord can be run through successive dips of the same or varying amounts of the above materials to get the desired buildup, this is unnecessary as satisfactory results generally can be accomplished in one dip.

DISCUSSION OF DETAILS AND PREFERRED EMBODIMENTS

The polyamide used as a reinforcing element may be an aromatic polyamide, an aliphatic polyamide, or a polyamide containing both aliphatic and aromatic units. These long chain polymeric amides are capable of being formed into filaments and have recurring amide groups as an integral part of the main polymer chain. The polyamide element can be a homopolymer, block or random copolymer, or a mixture of two or more of such polymers. The polyamide will usually have both crystalline and amorphous regions. Groups other than amide, respectively, may be present in minor amounts in these polymers, such groups including carbonate, urea, urethane, ether, ketone, imidazole, oxazole, and other oxygen-containing moieties.

In general, these high molecular weight polyamides are obtained by reacting polyamines, such as the alpha, omegadiamines, like 1,6-hexamethylene diamine, 1,5-pentamethylene diamine and 1,8-octamethylene diamine, with polycarboxylic acids, such as adipic acid, succinic acid, phthalic acid, chlorophthalic acid and the like. The polyamides may also be prepared by polymerization of aminocarboxylic acids, such as aminocaproic acid. Polyamides from caprolactam and p-aminobenzoic acid also can be used.

The high molecular weight aromatic or substantially aromatic polyamides may be obtained by condensation of metaphenylene diamines with isophthalic acid or paraphenylene diamines with terephthalic acids or m,p, or o-benzamides or mixtures of the above isomeric amines with isomeric acids. It is also possible to make polyamides using the above mentioned isomers with substituents on the phenyl groups, halogen (—Cl), alkyl (CH₃—), etc., or to use biphenyl acids with diamines or aromatic diamines and/or diacids in which the aromatic nuclei are spaced by:

—O—, —SO—, —CH₂—, —CO— and so forth. Instead of phenylene groups, the polymers can partly or totally contain heterocyclic rings.

Examples of such materials are polyhexamethylene adipamide, copolymers of metaphenylene diamine and terephthalic or isophthalic acid or acid chloride, poly[-bis-(4-amino-cyclohexyl)methanedodecamide], poly para-phenylene terephthalamide from phenylenediamine and terephthaloyl chloride, poly (hexamethylene terephthalamide), poly-m, or p-benzamide and the like. Examples of commercially available aliphatic polyamides are nylon 6 and nylon 66. Example of an aromatic polyamide is "Kevlar" (duPont). See U.S. Pat. Nos. 3,872,937; 3,888,805; and "Rubber & Plastics News," Mar. 19, 1979, pages 44-49.

The polyester reinforcing elements of the present invention are linear high molecular polyesters usually made by the condensation of α,ω-glycols and dicarboxylic acids. These polyester fibers and the like may be oriented and can have number average molecular weights up to about 60,000 and melting points up to about 300° C. Preferably, these polyesters exhibit substantial crystallinity, up to as much as about 50%, usually 38-45%, high strength and high tenacity. Also, preferred, are the polyesters in which the fiber is composed of at least 80% by weight of an ester of a dihydric alcohol and terephthalic acid such as poly(ethylene terephthalate). Examples of such polyesters are the high molecular weight polymers obtained from polyethylene glycols and the aromatic dicarboxylic acids, e.g., the high molecular weight condensation product obtained from ethylene glycol and terephthalic acid known as polyethylene terephthalate. Other polyesters which may be used are poly(ethylene oxybenzoate); polypivalalactone; terpolymers from dimethyl phthalate, dimethyl isophthalate and ethylene glycol; polyesters having at least two different repeating units from ethylene terephthalate, p-trimethylene oxybenzoate, and ethylene-1,4-diphenoxy butane-4,4'-dicarboxylate; poly (ethylene terephthalate-isophthalate); poly (1,4-cyclohexylenedimethylene terephthalate); and the like and mixtures thereof. Suitable polyester reinforcing elements are commercially available under the trademarks "Dacron" (duPont), "Encron" (American Enka Corporation) and "Vycron" (Beaunit Corporation). These high molecular weight linear polyesters are well known and can be made by methods known to the art. For example, the preparation of polyesters is shown by U.S. Pat. Nos. 2,465,319; 2,965,613 and 2,901,466. See, also, U.S. Pat. No. 3,861,980.

The polyamide or polyester reinforcing elements may be in the form of fibers, continuous filaments, staple, tow, yarns, cord, fabric and so forth. While mixtures of polyamide and polyester fibers etc. may be used, it is preferred to use one type of polymer. These polyamide or polyester cords may contain finishes or lubricants or be preactivated as they are made and sold, e.g., with urethane or epoxy groups for polyester.

The water soluble thermosetting (heat reactable) phenolic-aldehyde resin is made by reacting an aldehyde with a phenolic compound. An excess (over stoichiometry) of the aldehyde is reacted with the phenolic compound. The preferred aldehyde to use is formaldehyde, but acetaldehyde and furfural, also, may be used. In place of formaldehyde one may use paraform, the dry powder form of formaldehyde. Also, it is preferred to start with formalin, usually a 37% solution of formaldehyde in water, which is easier to use. Mixtures of aldehydes can be used. The phenolic compound can be phenol itself, resorcinol, the cresols, the xylenols, p-tert butylphenol or p-phenyl phenol or mixture thereof. Preferably, the reactants are formaldehyde and resorcinol which are reacted in water usually in the presence of an alkaline catalyst or an alkaline material is added before use. Information on the preparation of the water soluble thermosetting phenolicaldehyde resins will be found in "Encyclopedia of Chemical Technology," Kirk-Othmer, Volume 15, Second Edition, 1968, Interscience Publishers Division of John Wiley & Sons, Inc., New York, pages 176 to 208; "Technology of Adhesives," Delmonte, Reinhold Publishing Corp., New York, N.Y., 1947, pages 22 to 52; "Formaldehyde," Walker, A.C.S. Monograph Series, Reinhold Publishing Corp., New York, N.Y., Third Edition, 1964, pages 304 to 344 and "The Chemistry of Phenolic Resins," Martin, John Wiley & Sons, Inc., New York, 1956.

If desired, with more emphasis with respect to polyester cords, there may additionally be added to the aqueous phenolicaldehyde resin latex dip a heat reactable 2,6-bis(2,4-dihydroxy phenylmethyl)-4-chlorophenol composition usually as a 20% solids in aqueous alkaline (ammonia) solution. On a dry weight basis the cholorophenolic composition may be used in an amount by weight about substantially equal to the amount of the RF resin used. The chlorophenolic is a known compound ("Pexul" or H-7, I.C.I. America Inc.). See U.S. Pat. Nos. 3,660,202 and 3,861,980.

The rubbery graft copolymer or core/shell copolymer of butadiene-1,3, styrene and 2-vinyl pyridine is made by first forming a seed latex of a copolymer of butadiene-1,3, and styrene having parts by weight ratio of from about 40 to 60 of butadiene-1,3 to from about 60 to 40 of styrene using the method of U.S. Pat. No. 4,145,494, the disclosure of which is incorporated herein and made a part hereof by reference to the same. The copolymerization is carried to at least 85% conversion to form a seed (core) or back bone copolymer of butadiene-1,3 and styrene. According to U.S. Pat. No. 4,145,494 aqueous free radical emulsion polymerization of dienes and vinyl monomers is carried out using a mercaptan modifier or chain transfer agent wherein at least 75% conversion 1½ times the amount of modifier previously used is charged to the polymerization system and wherein the total modifier used is about 0.75 to 2.5 parts by weight for 100 parts by weight of monomer(s).

After the seed latex has been formed there is then charged to the reactor a mixture of butadiene-1,3 and 2-vinyl pyridine to form the shell or graft copolymer on the core. Other vinyl pyridines may be used such as 3-vinyl pyridine, 4-vinyl pyridine, 2-methyl-5-vinyl pyridine and 5-ethyl-2-vinyl pyridine. The amount of butadiene-1,3 and vinyl pyridine charged is a minor amount as compared to the amount charged to make the core or seed latex. However, the total amount charged should be sufficient to make in the final rubbery graft copolymer (core plus shell) of from about 47 to 69% by weight of butadiene, from 23 to 52% by weight of styrene and from 1 to 8% by weight of 2-vinyl pyridine.

The polymerization is then completed following the procedure of U.S. Pat. No. 4,145,494 to the desired conversion followed by steam stripping, preferred, or N$_2$ degassing. Sufficient emulsifier or stabilizer is carefully programmed during the shell formation on the core into the polymerization system to be absorbed on the copolymer particles so that the seed will grow and a graft or shell will form. Excess emulsifier should not be used to avoid formation of new micelles or particles. See "Encyclopedia of Polymer Science and Technology," Vol. 5, 1966, Interscience Publishers a division of John Wiley & Sons, Inc., New York. Final conversion (total core plus shell) may be above about 90%, the degree of final conversion depending generally on the economics involved and the amount of gel desired. It, thus, is seen that the core is generally substantially entirely a BD-STY copolymer; however, if polymerization is not complete, some STY may be copolymerized with the BD and VP of the shell. The gel content of the inner core or seed of the graft copolymer should be from about 0 to below 40%. The gel content of its outer graft or shell of the graft copolymer should preferably be about 0 to below 40% but may go up to below 70% (about 0 to <70%) if economics dictate high conversion and the H-adhesion is not adversely affected too much by such high conversions.

The latex may be post stabilized, care being observed to avoid materials which do not improve resistance to coagulation (on stirring) and/or which reduce H-adhesion adversely. Sodium decyl sulfate at 0.5 part did not affect polyester adhesion, improved nylon adhesion and improved mechanical stability of the latex. Normal additives such as urea, sodium sulfide, formaldehyde, and hydroquinone do not apparently affect H-adhesion. Potassium fatty acid soap causes a reduction in adhesion. Some other surfactants show a drop in H-adhesion.

The gel content of the shell, core or both of the rubbery vinyl pyridine graft copolymer may be determined by taking a sample of the particular latex involved, coagulating the rubber and separating the rubber from the water, milling the rubber obtained, dissolving the rubber in toluene and filtering the mixture to determine the gel content. See Whitby et al, "Synthetic Rubber," John Wiley & Sons, Inc., New York, 1954. The technique of polymerizing or copolymerizing one or more monomers in the presence of a polymer or a substrate, "grafting technique," is known and is frequently called graft polymerization or graft copolymerization. In this connection, please see "Copolymerization," High Polymers, Vol. XVIII, Ham, Pages 323-324, 335-420 and 573, Interscience Publishers a division of John Wiley & Sons, New York, 1964; "Block and Graft Polymers," Burlant and Hoffman, Reinhold Publishing Corporation, New York, 1960; "Block and Graft Copolymers," Ceresa, Butterworth & Co. (Publishers) Ltd., London, 1962; and "Graft Copolymers," Polymer Reviews, Vol. 16, Battaerd and Tregear, Interscience Publishers, a division of John Wiley & Sons, New York, 1967. The graft copolymer shell may contain all graft copolymer but also may be a mixture of homopolymers, copolymers as well as the graft itself. Thus, if the conversion of the core is not complete, then when the BD and VP are charged, the shell may contain some STY homopolymer, BD homopolymer, BD-STY, BD-VP and BD-VP-STY copolymers and so forth as well as the graft. However, what is important is that the VP (vinyl pyridine) moieties are on the outside of the copolymer where the adhesive effect is obtained.

The water soluble thermosetting RF resin and the rubbery copolymer are present together in the aqueous adhesive dispersion in an amount of from about 10 to 30% by weight solids (dry basis). The ratio of the RF resin to the rubbery vinyl pyridine graft copolymer on a dry weight basis generally is from about 10:100 to 40:100 parts by weight, preferably from about 12:100 to 30:100 parts by weight.

Up to about 50 parts by weight of the rubbery graft vinyl pyridine copolymer latex may be replaced with alkaline latex of a rubbery copolymer of about 40–50, preferably about 44–48, parts by weight of styrene and the balance butadiene-1,3. However, some loss in H-adhesion may be observed.

The pH of the dip should be on the alkaline side and the pH of any surfactants and stabilizers, including freeze-thaw stabilizers and other additives, should be on the alkaline side or compatible or be neutral to avoid improper coagulation of the latex(es).

Water is used in an amount sufficient to provide for the desired dispersion of the rubber or latex particles, and for the solution of the phenolic resin and any other additives, to obtain the desired viscosities, and for the proper solids content to get the necessary pickup of solids on and penetration between the fibers of the cord. The amount of water in the cord dip generally may vary as desired. However, too much water may require redipping or use of excess heat to evaporate the water on drying. Too little water may cause uneven coating or too slow coating speeds.

To apply the latex adhesive to the polyamide or polyester cords in a reliable manner, the cords are fed through the adhesive dip bath while being maintained under a small predetermined tension and into a drying oven where they are dried under a small predetermined tension. Slight stretching may be used where desired. As the cords leave the oven they enter a cooling zone where they are air cooled before the tension is released. In each case the adhesive-coated cords leaving the dip are dried in the oven at from about 300° to 500° F. (148.9° to 260° C.) for from about 150 to 30 seconds.

The time the cord remains in the adhesive is about a few seconds or more or at least for a period of time sufficient to allow wetting of the cord and some impregnation of the surface fibers of the cord. The dipping of the cords and the drying or curing of the adhesive treated polyamide or polyester cords may be accomplished in one or more dip tanks and in one or more ovens at different times and temperatures.

The single-cord H-pull, H-adhesion, test is employed to determined the static adhesion of the dried (heat set or cured) adhesive coated polyamide or polyester cords to rubber. In each case the rubber test specimens are made from a vulcanizable rubber composition comprising rubber, reinforcing carbon black and the customary compounding and curing ingredients. In every case the cords to be tested are placed in parallel positions in a multiple-strand mold of the type described in the single-cord H-pull adhesion test ASTM designated D 2138-67, the mold is filled with the unvulcanized rubber composition, the cords being maintained under a tension of 50 grams each, and the rubber is cured for 20 minutes at about 305° F. (151.7° C.) to the elastic state. Each rubber test specimen is ¼ inch thick and has a ⅜ inch cord embedment. After the rubber has been cured, the hot cured rubber piece is removed from the mold, cooled and H-test specimens are cut from said piece, each specimen consisting of a single cord encased in rubber and having each end embedded in the center of a rubber tab or embedment having a length of around 1 inch or so. The specimens are then aged at least 16 hours at room temperature (about 25° C.).

The force required to separate the cord from the rubber is then determined at room temperature or 250° F. (121.1° C.) using an INSTRON tester provided with specimen grips. The maximum force in pounds required to separate the cord from the rubber is the H-adhesion value. All the data submitted in the working examples which follow are based upon identical test conditions, and all of the test specimens were prepared and tested in the same way generally in accordance with ASTM Designation: D 2138-67.

Polyamide or polyester cords or fabric coated with the adhesive of the present invention using the one-step or single dip of this invention can have from about 3 to 15%, preferably from about 3 to 7%, by weight (dry) solids of the adhesive dip on the cord based on the weight of the cord and can be used in the manufacture of carcasses, belts, flippers and chafers of radial, bias, or belted-bias passenger tires, truck tires, motorcycle tires, off-the-road tires and airplane tires, and, also, in making transmission belts, V-belts, conveyor belts, hose, gaskets, tarpaulins and the like.

While the adhesive containing polyamide or polyester reinforcing elements can be adhered to a vulcanizable blend of natural rubber, rubbery cis-polybutadiene and rubbery butadiene-styrene copolymer or a blend of natural and rubbery butadiene-styrene copolymer by curing the same in combination together, it is apparent that the heat cured adhesive containing reinforcing elements can be adhered to other vulcanizable rubbery materials, by curing or vulcanizing the same in combination with the rubber, such as one or more of the foregoing rubbers as well as nitrile rubbers, chloroprene rubbers, polyisoprenes, polybutadienes, vinyl pyridine rubbers, acrylic rubbers, isoprene-acrylonitrile rubbers and the like and mixtures of the same. These rubbers can be mixed with the usual compounding ingredients including sulfur, stearic acid, zinc oxide, magnesium oxide, silica, carbon black, accelerators, antioxidants, antidegradants and other curatives, rubber compounding ingredients and the like well known to those skilled in the art for the particular rubbers being employed. Also, the adhesive dip of the present invention may also be used to adhere other cords, yarns and the like to rubber compounds.

The following examples will serve to illustrate the present invention with more particularity to those skilled in the art. In the examples the parts are parts by weight unless otherwise indicated.

EXAMPLE I

A polyester cord dip was made as follows. First, a resin composition was made:

| Ingredient | Parts Dry | Parts Wet |
|---|---|---|
| Soft Water | — | 333.4 |
| Sodium Hydroxide | 1.3 | 1.3 |
| Resorcinol | 16.6 | 16.6 |
| Formaldehyde (37%) | 5.4 | 14.7 |
| Total | 23.3 | 366.0 |

The resin composition was then mixed with the latex to make the dip as follows:

| Ingredient | Parts Dry | Parts Wet |
|---|---|---|
| Resin Comp. | 23.3 | 366.0 |
| Latex (about 41% TSC) | 100.0 | 244.0 |
| | 123.3 | 610.0 |

Total solids content of adhesive dip of about 20% (for purposes of calculating TSC use 4 parts of formaldehyde) .pH of 9.5.

The dip was then used to treat polyester cords which were dried or heat set, laminated with a rubber compound, cured and given a H-adhesion test as described supra.

A polyamide cord dip was made as follows (for Example II, below). First, a resin composition was made:

| Resin Composition | | |
|---|---|---|
| Ingredient | Parts Dry | Parts Wet |
| Soft Water | — | 238.5 |
| Sodium Hydroxide | 0.3 | 0.3 |
| Resorcinol | 11.0 | 11.0 |
| Formaldehyde (37%) | 6.0 | 16.2 |
| Total | 17.3 | 266.0 |

The resin composition was then mixed with the latex to make the dip as follows:

| Ingredient | Parts Dry | Parts Wet |
|---|---|---|
| Resin Comp. | 17.3 | 266.0 |
| Latex (about 41% TSC) | 100.0 | 244.0 |
| Soft Water | — | 60.0 |
| Total | 117.3 | 570.0 |

Total solids content of adhesive dip of about 20% (for purposes of calculating TSC use 3 parts of formaldehyde). pH of 9.

The dip was then used to treat polyamide cords which were dried or heat set, laminated with a rubber compound or stock, cured and tested for H-adhesion (See Example II) as described below.

The rubbery graft vinyl pyridiene copolymer latex used was prepared as described above and according to the teachings of U.S. Pat. No. 4,145,494. Except where noted, the core or seed was carried to a conversion of at least 85%. The extent of gel content is noted as H (70% and over), M (40 to below 70%) and L (0 to less than 40%). The constitution of latices used and the H-adhesion tests results are shown in the table below:

TABLE I

| Latex No. | % Gel of Graft Copolymer Core/Shell | Total % Conv. of Graft Copol. | Core (Charge to reactor) BD/S, parts |
|---|---|---|---|
| 1 | H*/L | 96 | 73.5/1.5 |
| 2 | L/L | 92 | 73.5/1.5 |
| 3 | H*/L | 88 | 60/15 |
| 4 | L/L | 88 | 60/15 |
| 5 | H*/L | 91 | 18.7/56.3 |
| 6 | L/L | 91 | 18.7/56.3 |
| 7 | L/L | 91 | 37.5/37.5 |

TABLE I-continued

| | | | |
|---|---|---|---|
| 8 | L/L | 95.9 | 37.5/37.5 |
| 9 | L/M | 96.6 | 37.5/37.5 |
| 10 | L/H | 98.7 | 37.5/37.5 |
| 11 | L/L | 94 | 37.5/37.5 |
| 12 | L/L | 92 | 37.5/37.5 |
| 13 | L/L | 93 | 37.5/37.5 |
| 14 | L/L | 96 | 37.5/37.5 |
| 15 | L/L | 91 | 45/45 |
| 16 | L/L | 92 | 45/45 |
| 17 | L/L | 92 | 32.5/32.5 |
| 18 | Control | 92(1) | — |
| 19 | Control | 99 + (1) | — |
| 20 | L/L | 96 | 37.5/37.5 |
| 21 | L/L | 93 | 37.5/37.5 |
| 22 | L/L | 93.7 | 37.5/37.5 |
| 23 | L/M | 97.5 | 37.5/37.5 |
| 24 | L/L | 94.7 | 37.5/37.5 |

| Latex No. | Shell (Charge to reactor) BD/VP, parts | H-adhesion (lbs) to Polyester (A) Cord using rubber stock P | |
|---|---|---|---|
| | | Cold | Hot |
| 1 | 20/5 | 29.4 | 13.8 |
| 2 | 20/5 | 41.0 | 17.0 |
| 3 | 20/5 | 44.5 | 23.8 |
| 4 | 20/5 | 45.8 | 19.5 |
| 5 | 20/5 | 45.2 | 22.3 |
| 6 | 20/5 | 48.7 | 23.1 |
| 7 | 20/5 | 47.5 | 33.6 |
| 8 | 20/5 | 49.4 | 34.9 |
| 9 | 20/5 | 44.8 | 29.3 |
| 10 | 20/5 | 42.8 | 26.5 |
| 11 | 22.5/2.5 | 46.1 | 31.9 |
| 12 | 17.5/7.5 | 44.5 | 29.7 |
| 13 | 24/1 | 41.5 | — |
| 14 | 25/0 | 37.3 | — |
| 15 | 9/1 | 43.9 | — |
| 16 | 10/0 | 37.7 | — |
| 17 | 35/0 | 37.1 | — |
| 18 | — | 43.6 | 30.3 |
| 19 | — | 41.5 | 26.7 |
| 20 | 21/4 | 56.4(2) | — |
| 21 | 20/5 | 55.2(2) | — |
| 22 | 22/3 | 54.5(2) | — |
| 23 | 21/4 | 48.8(2) | — |
| 24 | 21/4 | 52.8(2) | — |

*Carried to almost 99% conversion using little mercaptan modifier.
(1)Latex of 70-15-15 butadiene-styrene-vinyl pyridiene copolymer prepared by aqueous free radical emulsion copolymerization in conventional way with about 0.6 modifier per/100 total monomers, about 99 + % conversion, about 65 + % gel, no attempt to make graft copolymer, 41% solids, pH of 10.7, Mooney viscosity ML-4 at 212° F. (100° C.) of about 40.
(2)Rubber Stock Q.

EXAMPLE II

Additional dips were prepared according to the method of Example I, above, and tested on various cords for H-adhesion. The results obtained are shown in Table II, below:

TABLE II

| Latex or Latex Blends | H-adhesion (lbs.) | | | |
|---|---|---|---|---|
| | Polyester A Rubber Stock Q | | Polyester B Rubber Stock Q | |
| Latices | Hot | Cold | Hot | Cold |
| Run 20 | 33.9 | 54.6 | 34.2 | 50.4 |
| Control(1) | 31.2 | 46.7 | 31.2 | 44.8 |

| | Polyester A Rubber Stock P Cold | Polyester B Rubber Stock P Cold |
|---|---|---|
| Run 20 | 40.8 | 44.7 |
| Control(1) | 37.8 | 38.8 |

| Latex or Latex Blends | H-adhesion (lbs.) | | | |
|---|---|---|---|---|
| | Polyester A Rubber Stock Q | | Polyester B Rubber Stock Q | |
| 50/50 Blends | Hot | Cold | Hot | Cold |
| Run 20/SBR | 30.2 | 48.4 | 29.5 | 42.2 |
| Control(1)/SBR | 29.2 | 45.2 | 25.8 | 39.7 |

| | Polyester A Rubber Stock P Cold | Polyester B Rubber Stock P Cold |
|---|---|---|
| Run 20/SBR | 32.9 | 36.5 |
| Control(1)/SBR | 29.7 | 36.3 |

| | Polyester A Rubber Stock Q | | Polyester B Rubber Stock Q | |
|---|---|---|---|---|
| 80/20 Blends | Hot | Cold | Hot | Cold |
| Run 20/SBR | 34.8 | 50.8 | 31.2 | 49.7 |
| Control(1)/SBR | 32.4 | 48.1 | 28.5 | 49.1 |

| | Polyester A Rubber Stock P Cold | Polyester B Rubber Stock P Cold |
|---|---|---|
| Run 20/SBR | 35.7 | 39.7 |
| Control(1)/SBR | 32.4 | 42.9 |

| | Nylon Rubber Stock Q | | Polyester C Rubber Stock Q H-7(3) | |
|---|---|---|---|---|
| Latices | Hot | Cold | Hot | Cold |
| Run 20 | 35.3 | 52.5 | 36.4 | 61.0 |
| Control(1) | 25.4 | 50.3 | 35.7 | 58.8 |

| | Nylon Rubber Stock P Cold | Polyester C Rubber Stock P H-7(3) Cold |
|---|---|---|
| Run 20 | 49.1 | 42.6 |
| Control(1) | 52.3 | 41.2 |

| | Nylon Rubber Stock Q | | Polyester C Rubber Stock Q H-7(3) | |
|---|---|---|---|---|
| 50/50 Blends | Hot | Cold | Hot | Cold |
| Run 20/SBR | 33.7 | 52.0 | 29.8 | 44.4 |
| Control(1)/SBR | 31.7 | 49.8 | 28.7 | 51.3 |

| | Nylon Rubber Stock P Cold | Polyester C Rubber Stock P H-7(3) Cold |
|---|---|---|
| Run 20/SBR | 40.0 | 31.8 |
| Control(1)/SBR | 42.0 | 30.5 |

| | Nylon Rubber Stock Q | | Polyester C Rubber Stock Q H-7(3) | |
|---|---|---|---|---|
| 80/20 Blends | Hot | Cold | Hot | Cold |
| Run 20/SBR | 36.0 | 52.4 | 33.1 | 53.8 |
| Control(1)/SBR | 31.2 | 45.3 | 32.4 | 52.9 |

| | Nylon Rubber Stock P Cold | Polyester C Rubber Stock P H-7(3) Cold |
|---|---|---|
| Run 20/SBR | 43.0 | 35.7 |

TABLE II-continued

| Latex or Latex Blends | H-adhesion (lbs.) | |
|---|---|---|
| Control(1)/SBR | 48.3 | 32.4 |

(3) Polyester cord dip contained additionally 125.0 parts wet (on 610 parts wet of RFL) H-7 solution (20% H-7 in ammoniacal aqueous solution).

Notes for above Examples:
Polyester A - Celanese T-811, preactivated.
Polyester B - Celanese T-911, preactivated.
Polyester C - duPont "Dacron."
SBR - Latex of aqueous free radical emulsion polymerized rubbery copolymer of about 44–48% by weight of styrene and the balance butadiene-1,3, about 41–43% solids, pH of 10.5–11.5, Mooney viscosity of 60 to 90 ML-4 at 212° F. (100° C.), prepared in usual way with low modifier and no attempt to make a seed nor a graft copolymer.
H-7 - 2,6-bis (2,4-dihydroxyphenylmethyl)-4-chlorophenol composition.
BD - Butadiene-1,3.
S - Styrene.
VP - 2-vinyl pyridine.

P is the rubber compound or stock used for a series of H-adhesion tests:

P

| Component | Parts by Weight |
|---|---|
| Natural Rubber | 50. |
| Peptizer | .15 |
| Butadiene-Styrene rubber, SBR-1502 | 50. |
| High abrasion furnace carbon black | 35. |
| ZnO | 3. |
| Stearic Acid | 1. |
| Processing resin | 2. |
| Styrenated phenol | 1. |
| Naphthenic type oil, non-staining | 7. |
| Diphenyl guanidine | .15 |
| "Nobs" #1, 90% N-oxydiethylene-2-benzothiazyl-sulfenamide and 10% benzothiazyl disulfide, American Cyanamid Co. | 0.9 |
| Sulfur | 2.60 |

Q is the rubber compound or stock used for another series of H-adhesion tests:

Q

| Component | Parts by Weight |
|---|---|
| Natural Rubber | 46.50 |
| Polybutadiene rubber, cis type, solution polymerized, The General Tire & Rubber Co. | 15.00 |
| SBR 1778 (Blend 38.50 cold SBR Rubber and 14.40 Napthenic Oil) | 52.90 |
| Fine Extrusion Furnace Carbon Black | 66.00 |
| Tackifying resin | 2.50 |
| Naphthenic Oil | 12.00 |
| Zinc Oxide | 3.80 |
| Stearic Acid | 1.50 |
| Styrenated Phenol | 1.20 |
| "Altax," benzothiazyl disulfide. R. T. Vanderbilt Co. | 1.10 |
| "Thionex," tetramethyl thiuram monosulfide, duPont | .10 |
| "Crystex" (2.40 insoluble sulfur and .60 petroleum oil), Stauffer Chemical | 3.00 |

I claim:
1. A composition of matter comprising an aqueous alkaline dispersion of a rubbery graft low gel vinyl pyridine copolymer consisting essentially of
   (a) a core of a copolymer of butadiene-1,3 and styrene in the parts by weight ratio of butadiene-1,3 to styrene of about 40:60 to 60:40 and having a gel content of from about 0 to below 40% and
   (b) a shell of a copolymer of butadiene-1,3 and a vinyl pyridine and having a gel content of from about 0 to below 70% and
   (c) wherein in said graft copolymer the total amount of said monomers is from about 47 to 69% by weight of butadiene-1,3, from 23 to 52% by weight of styrene and from 1 to 8% by weight of the vinyl pyridine.
2. A composition of matter according to claim 1 where said shell contains a gel content of from about 0 to below 40% and where said vinyl pyridine is 2-vinyl pyridine.
3. A composition of matter according to claim 1 in which up to about 50 parts by weight of said graft copolymer was been replaced with a rubbery copolymer of about 40 to 50 parts by weight of styrene and the balance butadiene-1,3 and where said vinyl pyridine is 2-vinyl pyridine.

* * * * *